Sept. 7, 1937.　　　　　C. J. YOUNG　　　　　2,092,039
WATCH TESTING APPARATUS
Filed Sept. 30, 1933　　　3 Sheets-Sheet 1

INVENTOR:
Charles J. Young,
BY T R Goldsborough
ATTORNEY.

INVENTOR:
Charles J. Young,
BY T R Goldsborough
ATTORNEY.

Sept. 7, 1937. C. J. YOUNG 2,092,039
WATCH TESTING APPARATUS
Filed Sept. 30, 1933 3 Sheets-Sheet 3

Inventor
Charles J. Young
By
Attorney

Patented Sept. 7, 1937

2,092,039

UNITED STATES PATENT OFFICE 2,092,039

WATCH TESTING APPARATUS

Charles J. Young, Haverford, Pa., assignor to Radio Corporation of America, a corporation of Delaware Application September 30, 1933, Serial No. 691,636

9 Claims. (Cl. 73—51)

My invention relates to improvements in testing apparatus for determining the instantaneous rate of operation of a device and/or the relation between such instantaneous rate and the rate or frequency of operation of a standard.

In the manufacture and servicing of time pieces, it is naturally important that some means be provided for quickly and accurately determining whether or not they are running on time, and, if not, to what extent they are running fast or slow so that the proper correction can be made. Many different methods and apparatus have been used for this purpose, but these have required too much time for mass production or have been too expensive for wide use in the trade.

With the foregoing in mind, it is one of the objects of my invention to provide improved apparatus of the character referred to which is inexpensive and simple to operate and whereby a time piece, such as a watch, can be quickly adjusted to run true to standard time.

Another object of my invention is to provide improved apparatus of the character referred to which will give a visible indication representative of the rate of operation of a time piece and, simultaneously, give a visible indication of the rate of operation of a standard time piece for comparison.

Other objects and advantages will hereinafter appear.

In accordance with my invention, complementary elements are associated and caused to operate in such a manner as to produce optical effects representative respectively of the instantaneous rate of operation of a time piece under test and the rate of operation of a chronometer known to be running true to time, and means are provided for causing the optical effects to appear alternately so that the operator can determine at a glance which is representative of the instantaneous rate of operation of the device under test, and which is representative of the chronometer or standard.

Further, in accordance with my invention, complementary elements are associated and made to cooperate in such manner as to produce an optical effect representative of the rate of operation of a time piece or other device under test, one of the elements being supported for rotation and rotated at a known constant rate such as 60 R. P. M., one of the elements being in the form of a lamp which is caused to flash in time with the rate of operation of the device under test, one of the elements being in the form of a scale supported in a fixed position and which is manually adjustable so that a numerical reading can be obtained indicative of the instantaneous relation between the rate of operation of the device under test and the constant rate of rotation of the rotatable element.

My invention resides in the improved apparatus of the character hereinafter described and claimed.

For the purpose of illustrating my invention, several embodiments thereof are shown in the drawings, wherein Figure 1 is an elevational view, partly diagrammatic and partly in section, of testing apparatus constructed and operated in accordance with my invention;

Figure 1:
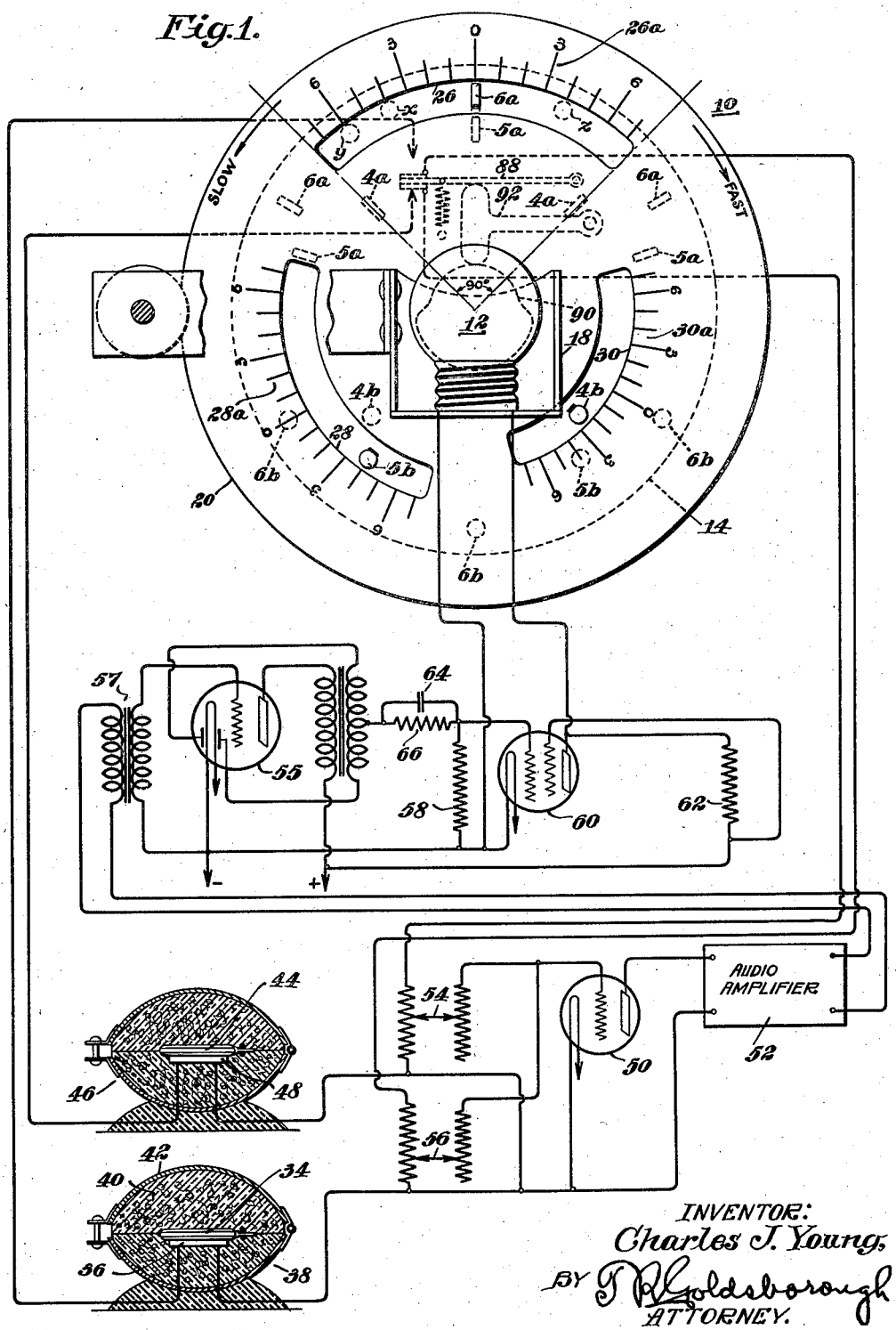
Figure 2:
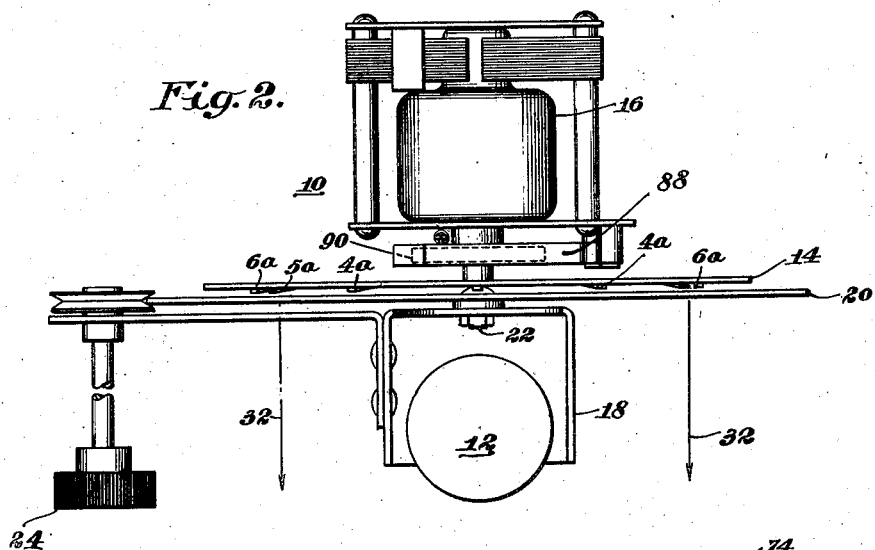
Fig. 2 is a plan view of Fig. 1.

In the embodiment of my invention shown in Figs. 1 and 2, the testing device or apparatus is designated by the reference numeral 10, and is comprised of the complementary elements arranged with respect to each other as shown to produce the desired optical effects referred to. One of these elements is in the form of a glow lamp 12, and another in the form of a disc 14 supported for rotation at a constant rate of 60 revolutions per minute by any suitable means such as a synchronous motor 16. It will be assumed that the disc 14 rotates in a counter-clockwise direction, as viewed in Fig. 1. Rectangular parts 4a and circular parts 4b, four in all, are struck out from the disc 14 and are evenly spaced from each other and disposed concentrically about the axis of rotation. Rectangular parts 5a and circular parts 5b, five in all, are struck out from the disc and are evenly spaced from each other and disposed concentrically about the axis of rotation, beyond the parts 4a and 4b. Also, rectangular parts 6a and circular parts 6b, six in all, are struck out from the disc and are evenly spaced from each other and disposed concentrically about the axis of rotation, beyond the parts 5a and 5b.

The surfaces of the parts struck out from the disc 14 are reflective to light from the lamp 12, and the remaining surface of the disc is non-reflective to light.

The lamp 12 is supported in a fixed position by a bracket 18 which also carries a scale 20 for rotation on a pin 22 upon manual adjustment of a knob 24.

As shown, the scale 20 is in the form of a disc provided with openings 26, 28 and 30, each subtending an angle of substantially ninety degrees, and is also provided on its surface with similar scales 26a, 28a, and 30a along the outer edges of the respective openings. The outer edges of these openings are concentric to the axis of rotation of the disc 14 and are at different distances from the axis, for the purpose hereinafter explained. The divisions of the scales 26a, 28a and 30a are such as to provide sixty equal divisions for a complete circle, so that each division represents one-sixtieth of a second.

In operation, the glow lamp 12 is caused to flash for each tick of the watch or other device under test for adjustment, and at each flash of the lamp, light is reflected from the struck out parts of the disc 14, as represented by the arrows 32 to produce small spots of light for observation from a point in front of the apparatus.

It will be understood that in most watches there are either four evenly spaced ticks a second, five evenly spaced ticks a second, or six evenly spaced ticks a second, depending upon the type of movement.

By means of automatic mechanism hereinafter described, the lamp 12 is caused to flash only in accordance with the ticks from the standard chronometer when the rectangular parts 4a, 5a or 6a are visible within one of the ninety degree angles shown. This mechanism also causes the lamp to flash only in accordance with the ticks from the watch under test when the circular parts 4b, 5b or 6b are visible within the corresponding ninety degree angle. By means of this arrangement, the operator will know that the rectangular light spots reflected from the parts 4a, 5a and 6a are representative of the rate of operation of the chronometer or standard, and that the round light spots reflected from the parts 4b, 5b and 6b are representative of the rate of operation of the time piece under test.

In operation, one of the openings in the scale 20 is within the ninety degree angle in Fig. 1, and in this way the viewing range or field is always restricted to this angle.

If both the standard watch and the watch under test make six ticks a second, for example, the disc 20 is manually adjusted to the position shown in Fig. 1 whereat the scale 26a is immediately above the light spots reflected from the parts 6a and 6b. In this position, the scale masks off the parts 4a, 4b, 5a and 5b from the lamp. The zero line of this scale is placed at one of the rectangular spots of light caused by the standard watch, as shown in Fig. 1. Now, if one of the round light spots caused by the watch under test appears at the point x, and remains stationary, it will be known that this watch is running true to time with the standard watch.

If the round light spot drifts to the left, it will be known that the watch under test is losing time. To determine exactly the rate at which the watch is losing time, the operator may observe that at the beginning of a minute period, the round light spot is at x, or four divisions to the left of zero on the scale. At the end of the minute period, the round light spot may have drifted to the point y, or to a position six divisions to the left of zero. In such case, it will be known that the watch under test is losing time at the rate of two-sixtieths of a second each minute, or at the rate of forty-eight seconds a day.

If, on the other hand, the round light spot drifts to the right, and during a minute period moves across eight divisions of the scale from the point x to the point z, for example, it will be known that the watch under test is gaining time at the rate of eight-sixtieths of a second each minute, or at the rate of three minutes and twelve seconds a day.

During the above description of the method of operation, it has been assumed that the synchronous motor and disc have been running on exact standard time. Usually this is not the case, as it is proposed to run the motor from a regulated 60-cycle power system, the frequency of which can be expected to drift slowly with respect to the standard watch. This drift is compensated for in the observation by occasionally resetting the zero point on the scale so that it is always opposite the same rectangular light spot made by the standard watch when a reading of scale division is made. Therefore, in extremely accurate observations of the rate of operation of a watch, the measurement made is independent of occurring fluctuations in the power supply frequency. On the other hand, approximate observations of the rate may be made without allowing for this fluctuation.

If the watch under test gives five ticks a second, a chronometer also giving five ticks a second is used, and the scale 20 is rotated to place the opening 28 in the upper position to expose only the parts 5a and 5b to the light from the lamp 12.

Likewise, if the watch under test gives four ticks a second, a chronometer also giving four ticks a second is used, and the scale 20 is rotated to place the opening 30 in the upper position to expose only the parts 4a and 4b to the light.

In the above two cases, the manner of operation is the same as explained when both the watch and the standard give six ticks a second.

The manner in which the lamp 12 is caused to flash will now be explained. The watch 34 under test is held against a microphone 36 in a casing 38. Two pieces 40 of sponge rubber are disposed within the casing, as shown, so that when the cover 42 of the casing is closed, the rubber will be somewhat compressed whereby the watch is held firmly against the microphone, and completely surrounded by the rubber material which provides effective acoustic shielding for preventing pickup of extraneous noises. The standard watch 44 is placed in a similar casing 46 and held against a microphone 48. The action is such that for each tick of either watch, the bias on the grid of a tube 50 is varied to permit plate current to flow for the instant, whereupon an impulse is developed which is amplified in an audio amplifier 52. Two gain controls 54 and 56 are provided, and are adjusted to cause the watches to excite the grid of the tube 50 the proper amount.

The output of the amplifier 52 supplies the grid circuit of a tube 55 through a transformer 57. At each impulse, the triode of the tube 55, represented as being of the type commonly designated in the trade as RCA-85, and the amplified impulse, representing the tick of the watch, is rectified by the diode to build up a momentary voltage across a resistance 58. This resistance is connected as shown in the grid circuit of a tube 60, the grid of which is at zero bias and, for this reason, the voltage drop from plate to cathode of this tube is normally insufficient to cause the lamp 12 to flash. In this circuit, the major part of the B voltage is across the plate resistor 62. When, however, the impulse caused by the tick of either watch is applied across the resistor 58, the grid of the tube 60 is biased negatively for the instant whereupon the B voltage is permitted to build up across the lamp 12 to cause the same to flash.

By inserting a condenser 64 and a resistance 66 in the grid circuit of the tube 60, as shown, the duration of the flash may be made as short as possible. The resistance 66 is relatively high, and the effect of the combination is to cause only the initial transient of the wave or "tick" to be effective in the grid of the tube 60.

In the circuit just described, a B supply of about 200 volts is required to cause the lamp 12 to flash, this requiring about 130 volts across the lamp. For use on a 110 volt D. C. supply, it is proposed to use the flash circuit shown in Fig. 3 wherein the tubes 68 and 70 correspond, respectively, to the tubes 55 and 60 in Fig. 1. The operating action in the first stage of this circuit is the same as that in Fig. 1. In other words, for each tick of either watch, a momentary voltage is built up across a resistance 72 which corresponds to and serves the same purpose as the resistance 58 in Fig. 1. Upon the occurrence of each impulse, the cathode of the tube 70 is made more negative with respect to the grid, whereupon the tube 70 will be caused to oscillate by reason of the transformer 74, the tuning capacity 76 and the by-pass capacities 78 and 80. The voltage of this oscillation is supplied by the transformer 74 to the glow lamp 12 in series with a D. C. polarizing voltage on the lamp from a bleeder resistance 82 across the B supply. At the termination of each tick of either watch, the tube 70 stops oscillating, and the lamp 12 goes out. A capacity 84 and a resistor 86 serve the same purpose, respectively, as the capacity 64 and the resistor 66 in Fig. 1.

The B supply across the resistance 82 is 110 volts and the adjustments are such that the frequency of oscillation in the tube 70 is of the order of 10,000 cycles, as might be required for best operation.

When the apparatus is designed for 110 volt D. C. operation, it is proposed to rotate the disc 14 by a telechron motor driven from a vacuum tube oscillator adjusted to supply 60 cycles. The lamp 12 is caused to flash alternately in accordance with the ticks from the watch 34 under test and the standard 44, by oscillation of a contact arm 88 through the agency of a cam 90 and a follower 92. The design of the cam 90 is such, and the connections are made as shown, so that for each first half revolution of the disc 14, for example, the lamp 12 will be caused to flash only in accordance with the ticks from the watch 34 under test, and for each second half revolution of the disc, the lamp will be caused to flash only in accordance with the ticks from the watch standard 44.

Figure 6:
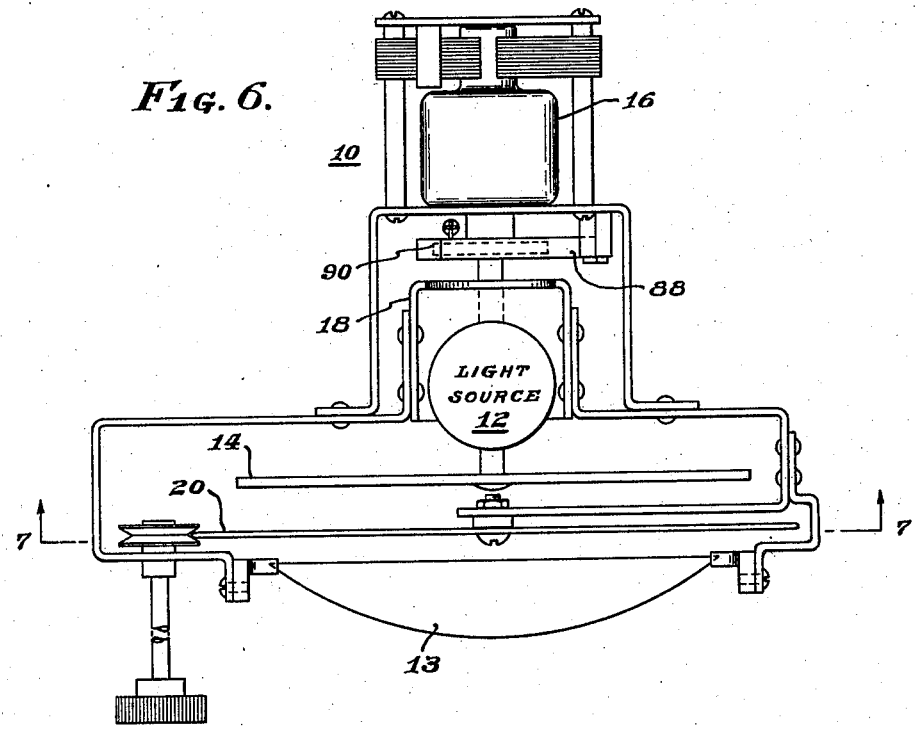
Figs. 6 and 7 are plan and elevational views of a modification of the embodiment of my invention illustrated in Figs. 1 and 2.
Figure 7:
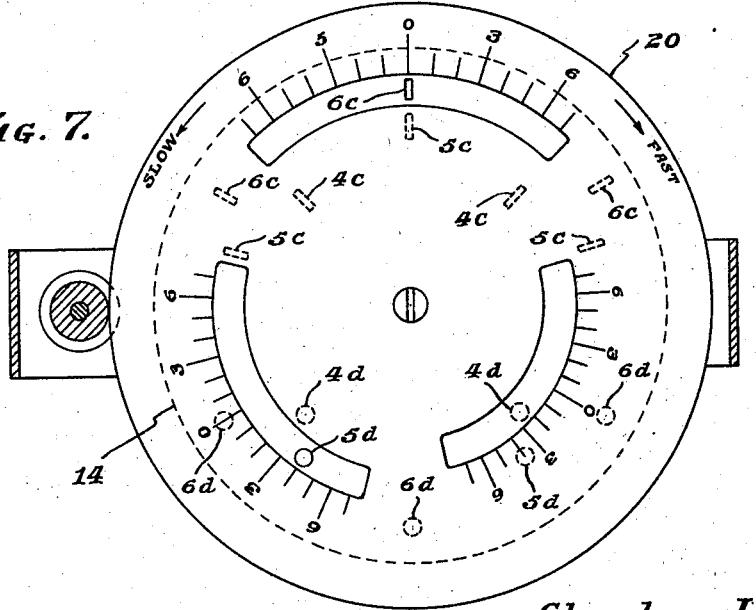

Instead of obtaining the indicating light spots by reflection from the disc 14, it is proposed to make sets of square and round openings in the disc corresponding respectively to and arranged the same as the struck out reflector parts. In such case, the lamp 12 is supported back of the disc 14, as shown in Figs. 6 and 7, and a lens 13 is supported in front of the scale 20, through which the operator observes the light spots caused by light from the lamp shining through the openings in the disc.

Figure 4:
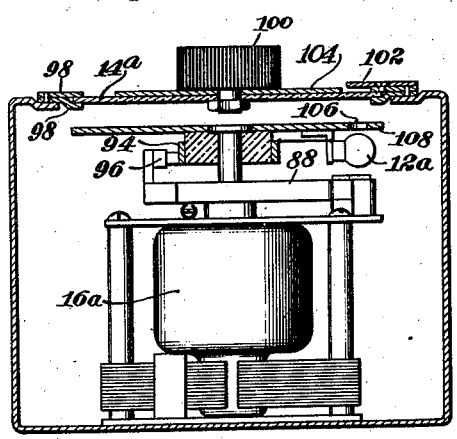
Fig. 4 is an elevational view, partly in section, of another embodiment of my invention.
Figure 5:
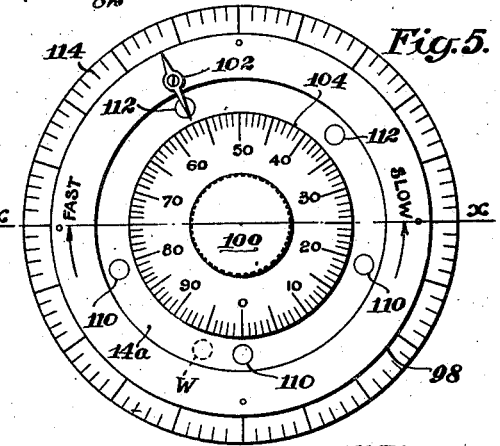
Fig. 5 is a plan view of Fig. 4.

In the embodiment of my invention shown in Figs. 4 and 5, the operating action is the same as in Fig. 1, except that the glow lamp 12a is rotated substantially at a constant rate of 60 R. P. M., and the disc 14a corresponding to the disc 14 in Fig. 1, remains stationary. On account of this change, voltage for the lamp is supplied through a slip-ring 94 and a brush 96. Also, the disc 14a is made of transparent glass. The glass disc is held between two rings 98 which rest in the circular depression shown in the edge of the casing, and the entire assembly can be rotated about the vertical axis by a knob 100. An index or pointer 102 is fixed to this assembly, and is complementary to a circular scale 104 which can be rotated with respect to the disc 14a by turning the knob 100.

There are one hundred equal divisions in the scale, each representing one one-hundredth of a second, with the lamp 12a rotating at the rate of one revolution a second.

Figure 3:
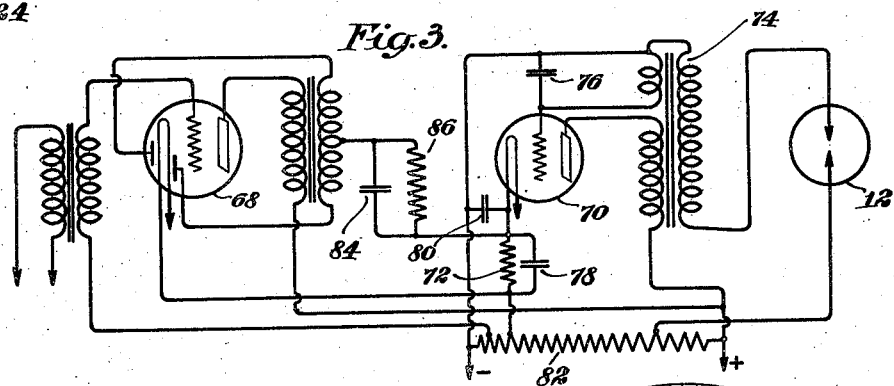
Fig. 3 is a diagrammatic view of a modification of the electrical control circuit in Fig. 1.

In this embodiment of my invention, the operating action and the electrical system and connections are the same as in Figs. 1, 2 and 3.

For example, in testing a watch which makes five ticks a second, with a chronometer which makes four ticks a second, the action is as follows. At each flash of the lamp 12a, the light shines through an aperture 106 in an opaque disc 108 fixed on the shaft of the motor 16a, and the operator observes light spots around the edge of the scale 104.

It will be assumed that the disc 14a is rotating in a counter-clockwise direction, as viewed in Fig. 5.

Similar to the action in Fig. 1, the cam 90 and the switch mechanism controlled thereby operate to cause the lamp to flash in accordance with the ticks from the watch under test only when the lamp is below the line $x$—$x$ in Fig. 5, and to flash in accordance with the ticks from the watch standard only when the lamp is above the line $x$—$x$. The operator, therefore, knows that the light spots 110 are those due to the ticking of the watch under test, and that the light spots 112 are those due to the ticking of the standard.

The entire top assembly is first rotated to place the pointer 102 over one of the spots 112, as shown in Fig. 4. The disc 14a and the rings 98 are then held stationary by the operator's hand, and the scale 104 is rotated to place the zero mark at one of the spots 110, as shown. The scale reading, for example, is then "57", as shown.

After waiting for one minute, during which the motor 16a may not have run exactly on time, the operator resets the apparatus, so that the pointer 102 is again at the same chronometer flash 112 as before. In doing this, the scale 104 is also turned the same amount as the pointer 102, and if the zero mark of the scale still falls on the same watch flash as before, it will be known that the rate of the watch agrees with that of the chronometer. However, if the watch has drifted during the minute period, a resetting of the scale 104, to place the zero mark thereof again at the same watch flash, will show how many hundredths of a second it is losing or gaining in one minute. For example, if the watch flash used drifts to the left to the position W during the minute period, the scale 104 must be rotated in a clockwise direction through five divisions to place the zero mark again at the watch flash. The scale reading at the pointer 102 will then be "62". Since the scale was rotated through five divisions in a clockwise direction, it will be known that the watch is gaining time at the rate of five hundredths of a second every minute.

The casing of the apparatus may be marked to provide a scale 114 for determining at what rate the motor 16a might be drifting.

If a synchronous motor is used and operated from a regulated power system, any drift of the chronometer flashes 112 will be very slow. Where a regulated 60 cycle supply is not available, it is proposed to use a good governor-controlled motor, such as a phonograph motor.

From the foregoing it will be seen that I have provided improved apparatus for quickly and accurately observing the instantaneous relation between the rate of operation of a device, such as a watch, and the rate of reoccurrence of a given effect, such as the ticking of a chronometer standard, and that for this purpose my improved apparatus produces, for comparison, simultaneously occurring optical effects representative respectively of such rates.

It will be understood that various embodiments and modifications other than those shown and described are possible without departing from the spirit of my invention or the scope of the claims.

I claim as my invention:

1. In testing apparatus for observing the instantaneous relation between the rate of operation of a device and the rate of reoccurrence of a given effect, complementary elements for producing optical effects representative respectively of such rates, one of said elements being in the form of a lamp, means for driving at least one of said elements at a substantially constant rate, an electrical circuit means for causing said lamp to flash, a pair of microphones each operable to control said circuit, and means driven by said driving means for rendering the microphones of said pair alternately effective to control the circuit.

2. In testing apparatus for observing the instantaneous relation between the rate of operation of a time piece and the rate of operation of a standard time piece, complementary elements for producing optical effects representative respectively of such rates, one of said elements being in the form of a lamp, means for rotating at least one of said elements, means including a cam driven by said first-named means and operating to cause said lamp to flash in accordance with such rates alternately, and means for identifying the optical effects caused by the operation of said time piece and said standard time piece.

3. In testing apparatus of the character described, complementary elements for producing an optical effect representative of the rate of operation of a device, one of said elements being supported for rotation, one of said elements being in the form of a lamp, means for rotating the rotatable element at a substantially constant rate, one of said elements being in the form of a scale supported in a fixed position during normal operation of said apparatus and manually adjustable from such position, said lamp being disposed to illuminate certain of the complementary elements to produce the optical effect adjacent to and along said scale, said scale being disposed and operable to provide a numerical reading indicative of the instantaneous relation between the rate of operation of the device and the rate of rotation of the rotatable element.

4. In testing apparatus of the character described, complementary elements for producing an optical effect representative of the rate of operation of a device, one of said elements being supported for rotation, one of said elements being in the form of a lamp, means for rotating the rotatable element at a substantially constant rate, one of said elements being in the form of a scale supported in a fixed position during normal operation of said apparatus and manually adjustable from such position, said lamp being disposed to illuminate certain of the complementary elements to produce the optical effect adjacent to and along said scale, and means for causing said lamp to flash in time with the rate of operation of the device, said scale being disposed and operable to provide a numerical reading indicative of the instantaneous relation between the rate of operation of the device and the rate of rotation of the rotatable element.

5. In apparatus for determining the rate of operation of a device, a disc provided with a scale at the edge thereof and supported in a fixed position during normal operation of said apparatus, a lamp supported for rotation beyond and around the edge of said disc, means for rotating said lamp at a substantially constant rate, a fixed member substantially transparent to light and disposed between said lamp and said disc, means associated with said lamp for directing a ray of light through said member at the edge of said scale, said scale being adjustable with respect to said member, and means for causing said lamp to flash in accordance with the rate of operation of said device.

6. In testing apparatus of the character described, complementary elements for producing an optical effect representative of the rate of operation of a device, one of said elements being in the form of a member supported for rotation about an axis substantially perpendicular thereto and provided with apertures evenly spaced and disposed substantially concentrically about the axis of rotation, one of said elements being in the form of a light source supported in a fixed position and disposed on one side of said member whereby the light can shine through said apertures to give the effect of light spots observed from the other side of said member, means for rotating said member at a substantially constant rate, said apparatus being provided with a scale supported for rotary adjustment substantially about said axis and disposed substantially concentrically about the same and adjacent the occurring light spots, the divisions of said scale being such as to provide a numerical reading indicative of the relation between the rate of operation of said device and the substantially constant rate of rotation of said member, and means for causing the light source to flash at a rate corresponding to the rate of operation of said device.

7. In testing apparatus of the character described, complementary elements for producing an optical effect representative of the rate of operation of a device, one of said elements being in the form of a plate substantially transparent to light, one of said elements being in the form of a light source supported and operable to direct a sharply defined ray of light at the latter in a region radially outwardly from the center of said plate, one of said elements being supported for rotation, means for rotating the rotatable element at a substantially constant rate, and means for causing the light source to flash at a rate corresponding to the rate of operation of said device, said apparatus being provided with a scale disposed substantially concentrically about the axis of rotation and substantially in said region, th divisions of said scale being such as to provide a numerical reading indicative of the relation between the rate of operation of said device and the substantially constant rate of rotation of the rotatable element.

8. In testing apparatus for observing the relative rates of operation of a pair of time pieces, the combination of a pair of elements, one of said elements being a light source, the other of said elements being a member having a series of portions responsive to said light source, means for rotating said other element at a substantially constant rate, means for deriving impulses from the operation of said time pieces for energizing said light source, and means for automatically and alternately impressing said impulses on said light source whereby the relative rates of operation of said time pieces may be observed by the relative frequency of illumination.

9. In a device of the character of claim 8, means for indicating the rate of variation of one of said time pieces with respect to the other.

CHARLES J. YOUNG.